United States Patent
Huang et al.

(10) Patent No.: US 10,795,166 B2
(45) Date of Patent: Oct. 6, 2020

(54) HEAD UP DISPLAY SYSTEM AND CONTROL METHOD THEREOF

(71) Applicant: PEGATRON CORPORATION, Taipei (TW)

(72) Inventors: Kuang-Ping Huang, Taipei (TW); Pei-Chin Wang, Taipei (TW); Chih-Chien Lu, Taipei (TW); Chia-Ming Lee, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 0 days.

(21) Appl. No.: 16/292,044

(22) Filed: Mar. 4, 2019

(65) Prior Publication Data

US 2019/0278094 A1    Sep. 12, 2019

(30) Foreign Application Priority Data

Mar. 7, 2018    (TW) .............................. 107107758 A

(51) Int. Cl.
*G02B 27/01* (2006.01)
*G06F 3/01* (2006.01)

(52) U.S. Cl.
CPC ..... *G02B 27/0179* (2013.01); *G02B 27/0101* (2013.01); *G06F 3/013* (2013.01); *G02B 2027/014* (2013.01); *G02B 2027/0138* (2013.01); *G02B 2027/0181* (2013.01); *G02B 2027/0187* (2013.01)

(58) Field of Classification Search
CPC ............ G02B 27/0179; G02B 27/0101; G02B 2027/014; G02B 2027/0187; G02B 2027/0181; G02B 2027/0138; G02B 27/0093; G06F 3/013; B60K 37/00
See application file for complete search history.

(56) References Cited

U.S. PATENT DOCUMENTS

| | | | | |
|---|---|---|---|---|
| 8,692,739 | B2* | 4/2014 | Mathieu | G02B 27/01 345/7 |
| 9,690,104 | B2 | 6/2017 | Kim | |
| 10,250,860 | B2* | 4/2019 | Kurosawa | H04N 9/3185 |
| 10,510,276 | B1* | 12/2019 | Lee | G02B 27/0179 |
| 2006/0262140 | A1* | 11/2006 | Kujawa | G06T 19/006 345/633 |

(Continued)

FOREIGN PATENT DOCUMENTS

CN    106445104    2/2017

*Primary Examiner* — Bryan Earles
(74) *Attorney, Agent, or Firm* — J.C. Patents

(57) ABSTRACT

A head up display system for a vehicle is provided, including an eye tracking device and a head up display device. The eye tracking device is configured to pre-locate an initial gaze position of a driver of the vehicle before the vehicle starts moving and to detect a gaze position of the driver in real time. The head up display device includes a projector and a processor. The processor is coupled to the eye tracking device and the projector. The processor compares the gaze position with the initial gaze position, and controls the projector to project a display image to a first projection position or a second projection position according to a comparison result, wherein the first projection position corresponds to the initial gaze position and the second projection position corresponds to the gaze position. A control method of a head up display system is also provided.

19 Claims, 5 Drawing Sheets

(56) References Cited

U.S. PATENT DOCUMENTS

| | | | |
|---|---|---|---|
| 2012/0154441 A1* | 6/2012 | Kim | G06K 9/00832 |
| | | | 345/633 |
| 2013/0050070 A1* | 2/2013 | Lewis | G02B 27/017 |
| | | | 345/156 |
| 2016/0018889 A1* | 1/2016 | Skogo | H04N 5/23219 |
| | | | 348/78 |
| 2016/0029883 A1* | 2/2016 | Cox | G06F 3/013 |
| | | | 351/209 |
| 2016/0178902 A1* | 6/2016 | Ando | B60K 35/00 |
| | | | 348/115 |
| 2017/0059872 A1* | 3/2017 | Banyay | G02B 27/0179 |
| 2018/0065482 A1* | 3/2018 | Yagyu | B60Q 9/008 |

* cited by examiner

HEAD UP DISPLAY SYSTEM AND CONTROL METHOD THEREOF

CROSS-REFERENCE TO RELATED APPLICATION

This application claims the priority benefit of Taiwan application serial no. 107107758, filed on Mar. 7, 2018. The entirety of the above-mentioned patent application is hereby incorporated by reference herein and made a part of this specification.

BACKGROUND

Technology Field

The disclosure relates to a head up display system and a control method thereof, particularly to a head up display system for a vehicle, and a control method of the head up display system.

Description of the Related Art

In recent years, various display devices for transportation means have been developed one after another. A conventional display device is typically mounted on a dashboard of a vehicle. However, when a driver looks down at the display device mounted on the dashboard, driving safety may be a concern. Accordingly, a head up display (HUD) that projects an image onto a windshield is currently widely used in automotive devices. "Head up" means that a user can see important information they need without looking down. The head up display may project the driver's required information, such as vehicle speed, engine speed, whether a vehicle door is closed, driving mileage or fuel consumption, onto the windshield for the driver to view, so that the driver does not need to look down or turn their head and can avoid distraction. Thus, driving safety can be improved.

However, a general head up display projects images at a fixed position. Thus, as the driver shifts their gaze or changes their gaze position, the projected information does not change position accordingly. As a result, the driver cannot directly obtain the information and still needs to look down or turn their head in order to view the projected image. In addition, vibration generated when the transportation means travels may affect projection accuracy of the head up display over time, such that the projection position may gradually deviate from an originally expected projection position, which affects viewing convenience and image quality. The above problems may affect the use quality of the head up display.

SUMMARY

The disclosure provides a head up display system and a control method thereof, which allow a projection image to change its display position as a driver's gaze moves.

A head up display system according to an embodiment of the disclosure is applied to a vehicle, the head up display system including a head up display device and an eye tracking device. The eye tracking device is configured to pre-locate an initial gaze position of a driver of the vehicle before the vehicle starts moving and to detect a gaze position of the driver in real time. The head up display device includes a projector and a processor. The processor is coupled to the eye tracking device and the projector. The processor compares the gaze position with the initial gaze position, and controls the projector to project a display image onto a first projection position or a second projection position according to a comparison result, wherein the first projection position corresponds to the initial gaze position and the second projection position corresponds to the gaze position.

A control method of a head up display system according to an embodiment of the disclosure includes the following. Before a vehicle starts moving, an initial gaze position of a driver of the vehicle is pre-located by an eye tracking device, and a first projection position is generated according to the initial gaze position. A gaze position of the driver is detected in real time by the eye tracking device, and a second projection position is generated in real time according to the gaze position. The gaze position is compared with the initial gaze position, and a projector is controlled to project a display image onto the first projection position or the second projection position according onto a comparison result.

Based on the above, the head up display system and the control method thereof according to the embodiment of the disclosure are applied to a vehicle. By pre-locating the initial gaze position before the vehicle starts moving, tracking the driver's gaze position in real time, and then comparing the driver's current gaze position with the initial gaze position to control the position of the projected display image, it is possible to change a display position of the projection image as the driver's gaze shifts. Therefore, use convenience is increased.

To make the above features and advantages of the disclosure more comprehensible, examples accompanied with drawings are described in detail as follows.

DETAILED DESCRIPTION

Figure 1:
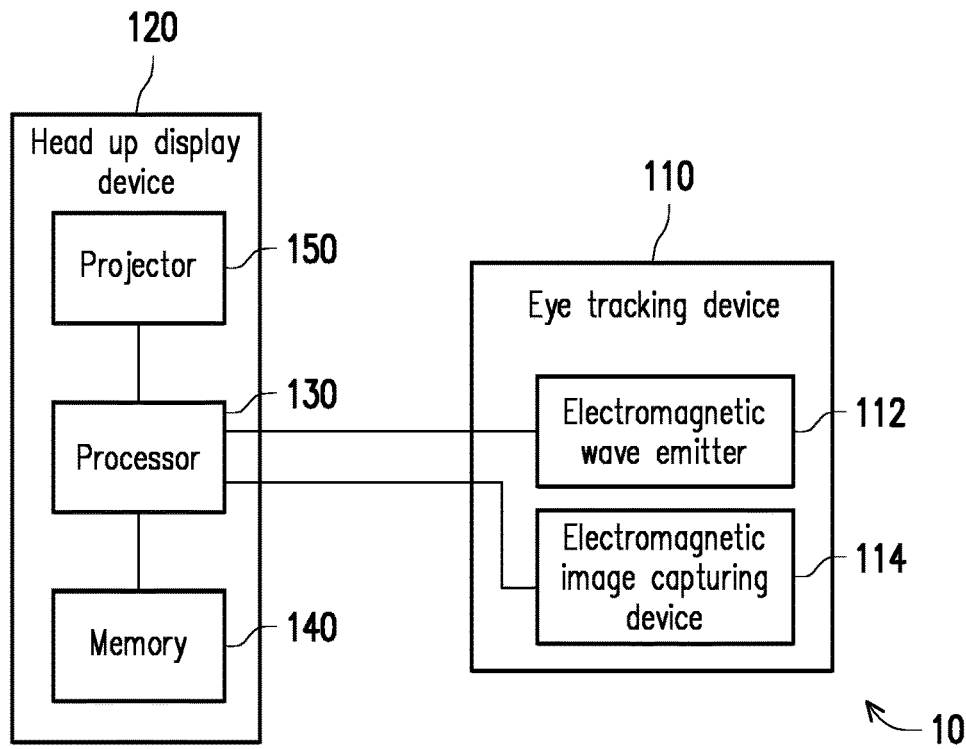
FIG. 1 is a block diagram of a head up display system according to an embodiment of the disclosure.
Figure 2:
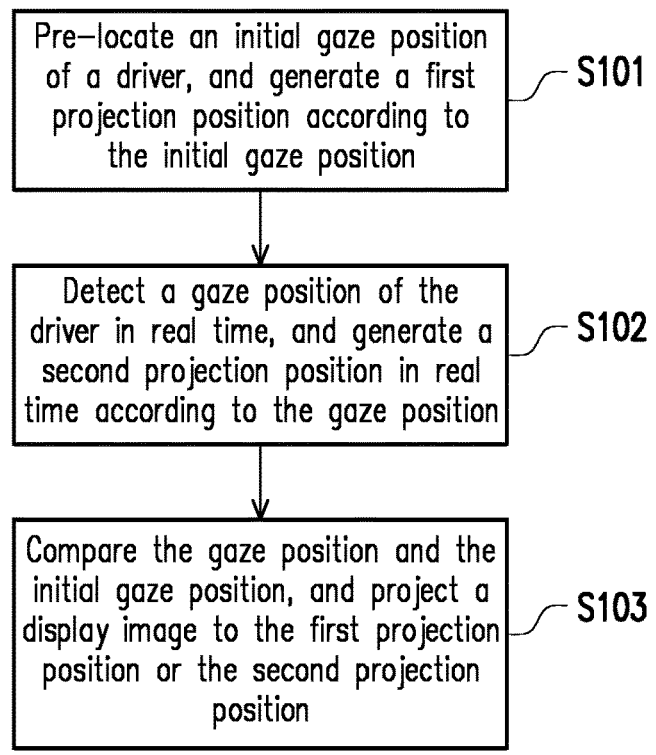
FIG. 2 is a flowchart of a control method of a head up display system according to an embodiment of the disclosure.

FIG. 1 is a block diagram of a head up display system according to an embodiment of the disclosure. FIG. 2 is a flowchart of a control method of a head up display system according to an embodiment of the disclosure. Referring to FIG. 1 and FIG. 2, a control method 100 in FIG. 2 is applicable to a head up display system 10 in FIG. 1. The head up display system 10 of the present embodiment and the control method 100 thereof are described below with reference to components in the head up display system 10.

The head up display system 10 includes an eye tracking device 110 and a head up display device 120, the head up display device 120 including a processor 130, a memory 140 and a projector 150.

The head up display system 10 is adapted to be mounted on a vehicle and continuously projects a display image for a driver of the vehicle to view while driving or riding the vehicle. The above-mentioned vehicle is a transportation means that moves under human manipulation, and examples thereof include various cars, buses, bicycles, motorcycles, vessels, airplanes, mobile machinery and the like, but the disclosure is not limited thereto. In addition, the eye tracking device 110 of the head up display system 10 is configured to track the driver's gaze direction or gaze position.

Firstly, in step S101, before the vehicle starts moving, the processor 130 pre-locates the driver's gaze position in a stationary state as an initial gaze position through the eye tracking device 110, and generates a first projection position according to the initial gaze position. Next, in step S102, the processor 130 detects the driver's gaze position (including before or after start of the vehicle) in real time through the eye tracking device 110, and generates a second projection position in real time according to the gaze position. Next, in step S103, after generating the second projection position, the processor 130 compares the driver's gaze position at this moment with the initial gaze position, and controls a projection direction of the projector 150 according to a comparison result to project a display image onto the first projection position or the second projection position. The first projection position and the second projection position may be below the initial gaze position and below the gaze position, respectively. Herein, the terms "above" and "below" are relative to the driver. For example, "above" means in the direction toward the driver's head, and "below" means in the direction toward the driver's foot. Alternatively, "above" and "below" may be relative to the driver's eyes. An acute angle is formed between the first projection position and the initial gaze position, and another acute angle is also formed between the second projection position and the gaze position.

The eye tracking device 110 is a device capable of tracking and measuring the position and movement of eyeballs, and is adapted for detecting the driver's eyeball characteristics. The eye tracking device 110 emits an electromagnetic wave to the driver's eyeballs and takes an image of the driver's eyes. In the present embodiment, the eye tracking device 110 includes an electromagnetic wave emitter 112 and an electromagnetic image capturing device 114. In an embodiment, the electromagnetic wave emitter 112 emits an electromagnetic wave to irradiate on an eye area of the driver, causing a bright spot in the eyes. The electromagnetic wave emitter 112 herein may be an infrared emitter or an emitter emitting electromagnetic waves of other bands. The disclosure is not limited thereto. The electromagnetic image capturing device 114 is configured to capture a facial image of the driver, or an eye image of the driver after the electromagnetic wave arrives and is reflected by the eye area. The electromagnetic image capturing device 114 is an image capturing device capable of reacting to the electromagnetic wave emitted by the electromagnetic wave emitter 112. For example, when the electromagnetic wave emitter 112 is an infrared emitter, an infrared video camera is used as the electromagnetic image capturing device 114. Both the electromagnetic wave emitter 112 and the electromagnetic image capturing device 114 are coupled to the processor 130. Thus, the processor 130 controls the electromagnetic wave emitter 112 and receives the eye image of the driver.

The processor 130 detects a pupil position and a bright spot position of the driver in the eye image of the driver, and determines a position currently gazed by the eyeballs according to a corresponding relationship between the pupil position and the bright spot position.

The processor 130 is coupled to the eye tracking device 110, the memory 140 and the projector 150, so as to control an overall operation of the head up display system 10. In the present embodiment, the processor 130 is, for example, a central processing unit (CPU), or other programmable microprocessor, a digital signal processor (DSP), a programmable controller, an application specific integrated circuit (ASIC), a programmable logic device (PLD), or other hardware device capable of computing. However, the disclosure is not limited thereto.

The memory 140 is, for example, any type of fixed or portable random access memory (RAM), read-only memory (ROM), flash memory, hard disk drive or other similar device, or a combination of the above. The memory 140 is configured to store data, codes, and images and so on that may be used during operation of the head up display system 10. That is, the processor 130 is configured to execute a plurality of commands stored in the memory 140 to control the head up display system 10.

Figure 3:
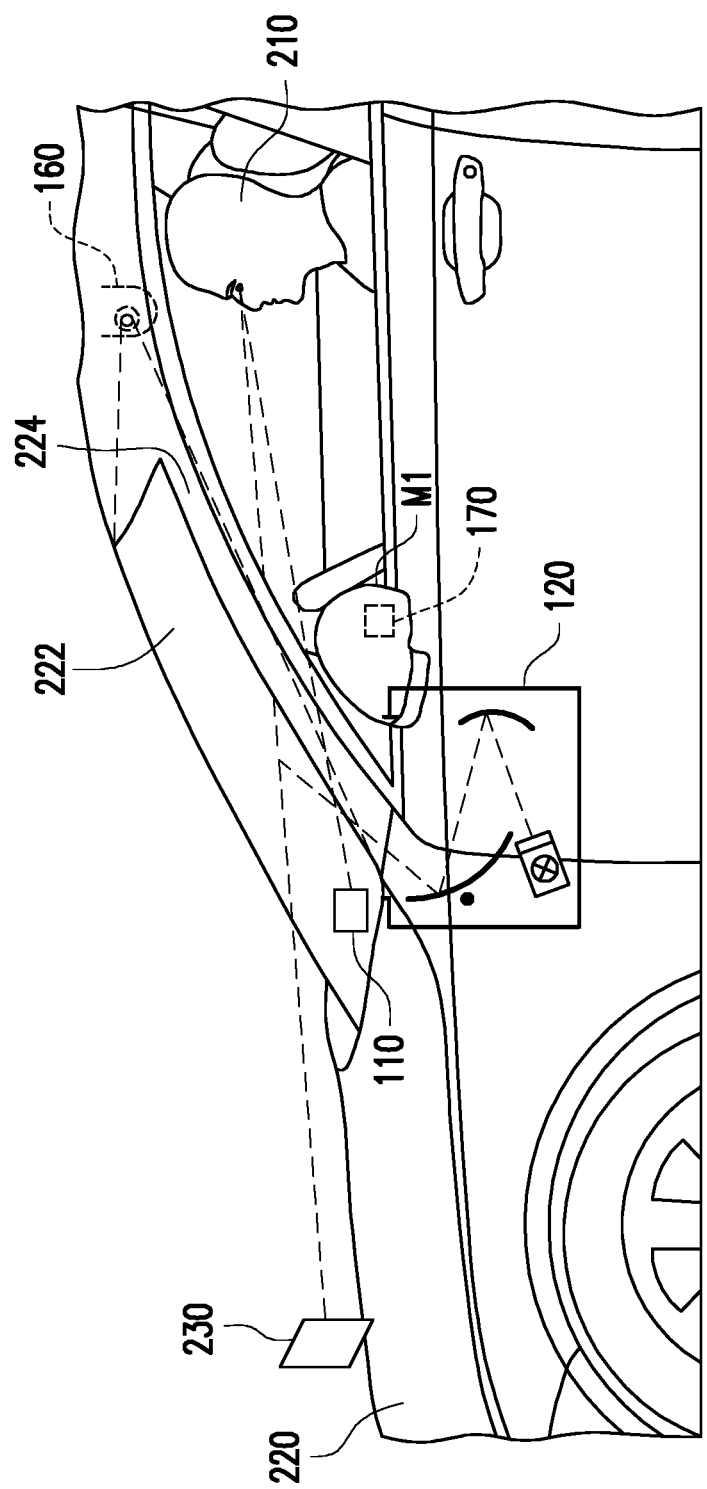
FIG. 3 is a schematic diagram of a head up display system and a vehicle according to an embodiment of the disclosure.

FIG. 3 is a schematic diagram of a head up display system and a vehicle according to an embodiment of the disclosure. Referring to FIG. 3, in the present embodiment, the head up display system 10 is applied in a car driving environment. When a driver 210 is located in a vehicle 220 (i.e., vehicle), the head up display device 120 projects a display image 230 onto a windshield 222 for the driver 210 to view. The display image 230 displays, for example, information of the vehicle 220, such as vehicle speed, direction, engine speed, whether a vehicle door is closed, driving mileage, fuel consumption, navigation information, or incoming call prompt. The disclosure does not limit the content displayed on the display image 230.

The eye tracking device 110 may be disposed on one side of the vehicle 220 facing the driver 210, for example, the side including the windshield 222, to allow the electromagnetic wave emitter 112 to emit an electromagnetic wave to the driver's eyes easily. The electromagnetic image capturing device 114 may be disposed on the same side as the electromagnetic wave emitter 112. For example, FIG. 3 shows that the electromagnetic image capturing device 114 and the electromagnetic wave emitter 112 are both disposed in a dashboard area. In addition, the electromagnetic image capturing device 114 and the electromagnetic wave emitter 112 may be disposed apart from each other. For example, the electromagnetic image capturing device 114 may be disposed on one side of a rear-view mirror M1 or on a vehicle case 224, so as to capture an eye image of the driver 210 in the direction toward the driver 210, thereby detecting the gaze position of the driver 210. The electromagnetic wave emitter 112 may be disposed in the center of a steering wheel or above the windshield 222.

However, FIG. 3 is only for exemplary purposes. The implementation manners, quantities and actual positions of the eye tracking device 110 and the head up display device 120 are not limited in the disclosure and may be designed according to actual application conditions.

Figure 4:
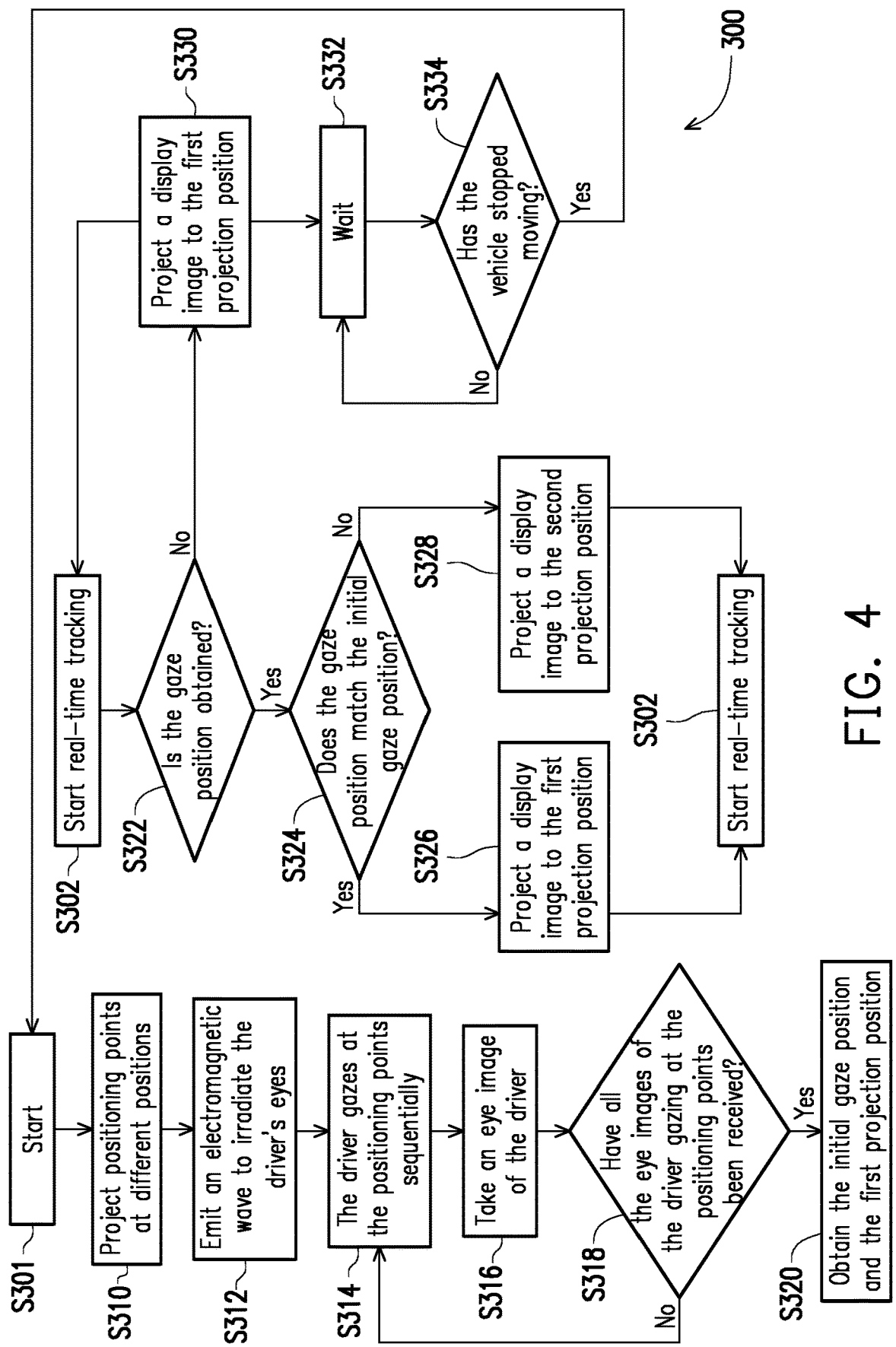
FIG. 4 is a flowchart of a control method of a head up display system according to another embodiment of the disclosure.

FIG. 4 is a flowchart of a control method of a head up display system according to another embodiment of the disclosure. Referring to FIG. 4, a control method 300 of the present embodiment is applicable to the head up display system 10 and the control method 100 in the above embodiment. Detailed steps of changing a projection position of the head up display system 10 according to the gaze position of the driver 210 are described below with the components in the head up display system 10 and the embodiments in FIG. 1 to FIG. 3.

Before the vehicle 220 starts moving, step S301 is performed to start pre-locating. In step S310, the processor 130 controls the projector 150 to project positioning points at respective positions on the windshield 222.

Figure 5:
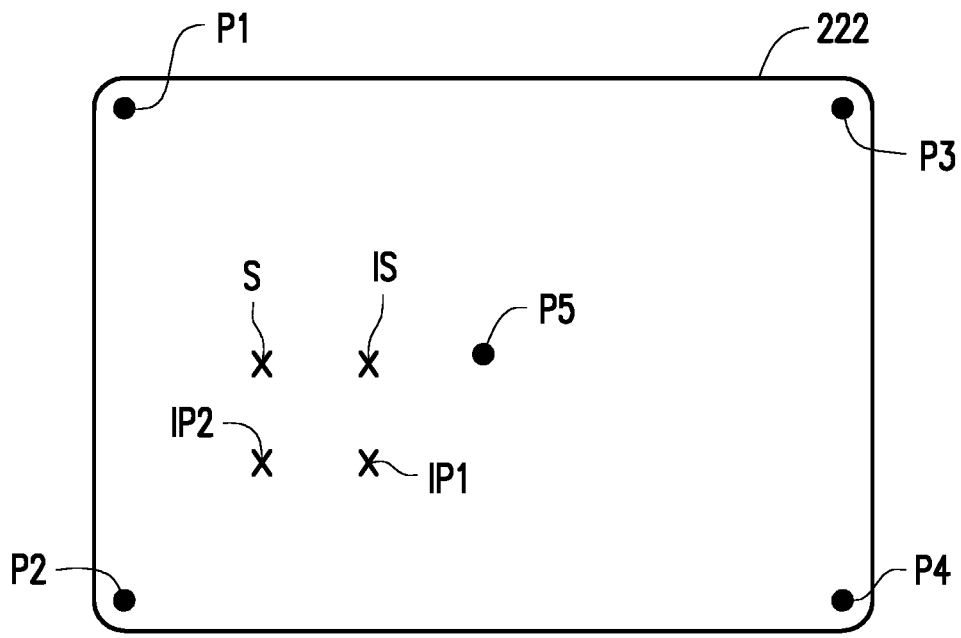
FIG. 5 is a schematic diagram of placements of positioning points and gaze positions on a windshield according to an embodiment of the disclosure.

FIG. 5 is a schematic diagram of placements of positioning points and gaze positions on a windshield according to an embodiment of the disclosure. Referring to FIG. 5, five positioning points P1 to P5 are projected at five respective positions, including four corners and the center of the windshield 222. The projector 150 may project one positioning point or a plurality of positioning points at a time, and the disclosure is not limited thereto.

Next, the gaze of the driver 210 is located. The processor 130 first obtains eye images of the driver 210 gazing at the positioning points P1 to P5 one after another through the eye tracking device 110, and then determines an initial gaze position IS according to the eye images of the driver 210. In step S312, the electromagnetic wave emitter 112 emits an electromagnetic wave to irradiate on the eyes of the driver 210. In step S314, the driver 210 gazes at one of the positioning points, for example, the positioning point P1 in the upper left corner. In step S316, the electromagnetic image capturing device 114 takes an eye image of the driver 210 gazing at the positioning point P1, and provides the eye image of the driver 210 to the processor 130. It is to be noted that the order of steps S310 and S312 is not fixed, and it is also possible to irradiate on the eyes and then project a positioning point for the driver 210 to view. The disclosure does not limit the order of the above steps.

Next, in step S318, the processor 130 determines whether all the eye images of the driver 210 gazing at the positioning points P1 to P5 have been received; if not, the process returns to step S314 (the process returns to step S310 if the projector 150 projects only one positioning point at a time), in which the driver 210 gazes at the next positioning point other than the positioning point P1, such as one of the positioning points P2 to P5. It is to be noted that the disclosure does not limit the order and the number of times the driver 210 gazes at the positioning points P1 to P5. When the processor 130 determines that all the eye images of the driver 210 gazing at the positioning points P1 to P5 have been received, the process proceeds to step S320. In step S320, the processor 130 determines the initial gaze position IS and a first projection position IP1 according to the eye images of the driver 210 corresponding to the positioning points P1 to P5.

The initial gaze position IS is, for example, a gaze position of the driver 210 gazing forward while sitting in the driver's seat. The first projection position IP1 may be calculated from the initial gaze position IS by, for example, using the eyes of the driver 210 as a reference point. The first projection position IP1 is 15 degrees below the initial gaze position IS, which is a position allowing the driver 210 to easily view without affecting their vision.

Next, step S302 is performed to start real-time tracking. In step S322, the processor 130 obtains the gaze position of the driver 210 in real time through the eye tracking device 110. If the eye tracking device 110 successfully detects an eyeball movement of the driver 210 such that the processor 130 obtains the gaze position at this moment, step S324 is performed, in which the processor 130 compares the gaze position with the initial gaze position SI to generate a comparison result indicating whether the gaze position matches the initial gaze position SI. When the comparison result indicates a match, i.e., when the gaze position matches the initial gaze position SI, step S326 is performed in which the display image 230 is projected onto the first projection position IP1. When the comparison result indicates no match, i.e., when the gaze position is the gaze position S and does not match the initial gaze position SI, step S328 is performed in which the display image 230 is projected onto a second projection position IP2. Then, step S302 is repeated. The processor 130 calculates the second projection position IP2 according to the gaze position S, and the second projection position IP2 is, for example, a position 15 degrees below the gaze position S.

In step S322, if the eye tracking device 110 fails to detect the gaze position in real time due to some factors such as violent vibration, sudden brake and so on, step S330 is performed in which the processor 130 controls the projector 150 to project the display image 230 onto the preset first projection position IP1. Next, in step S332, the display image 230 is continuously projected onto the preset first projection position IP1, while the processor 130 keeps waiting and temporarily stops the real-time tracking operation of step S302 until step S334 in which the processor 130 determines that the vehicle speed of the vehicle 220 is 0 (the vehicle is stationary). Then, step S302 is performed again so as to update the initial gaze position IS and the first projection position IP1.

In an embodiment, after step S330, in addition to performing step S332 to wait for re-locating the initial gaze position IS, step S302 is simultaneously performed so as to attempt to obtain a real-time gaze position. That is to say, the display image 230 is projected onto the first projection position IP1 until the eye tracking device 110 detects a new gaze position. Once the new gaze position is obtained, the processor 130 re-compares the gaze position with the initial gaze position IS, so as to continue to provide a display image with its display position adjusted with a shift in the gaze direction of the driver 210.

Figure 6:
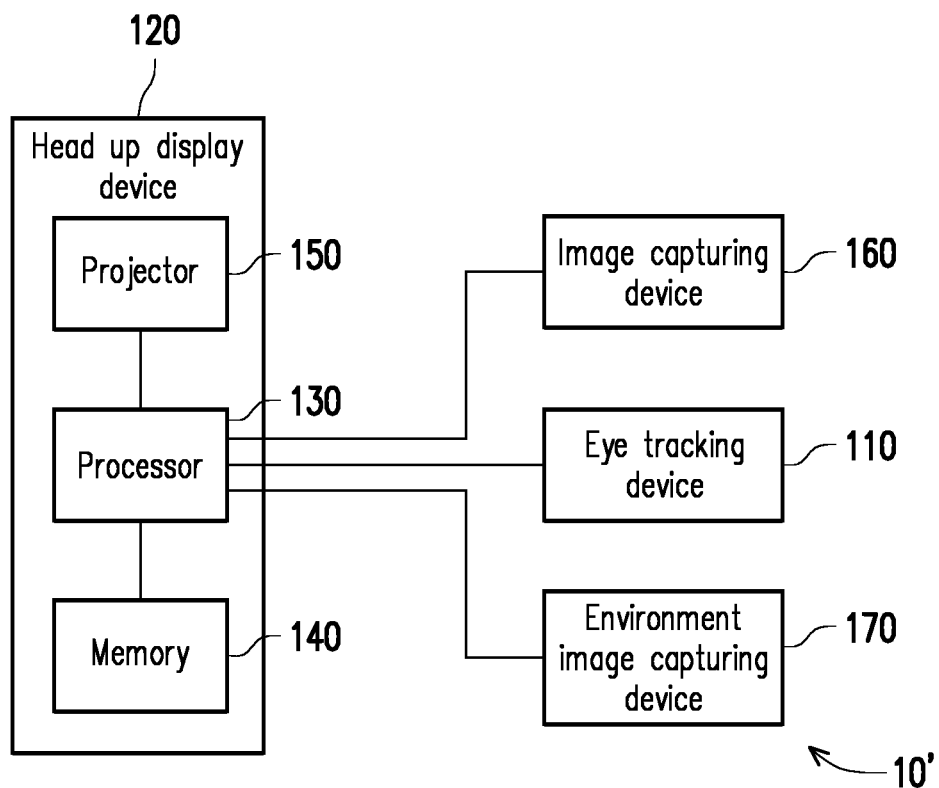
FIG. 6 is a block diagram of a head up display system according to another embodiment of the disclosure.
Figure 7:
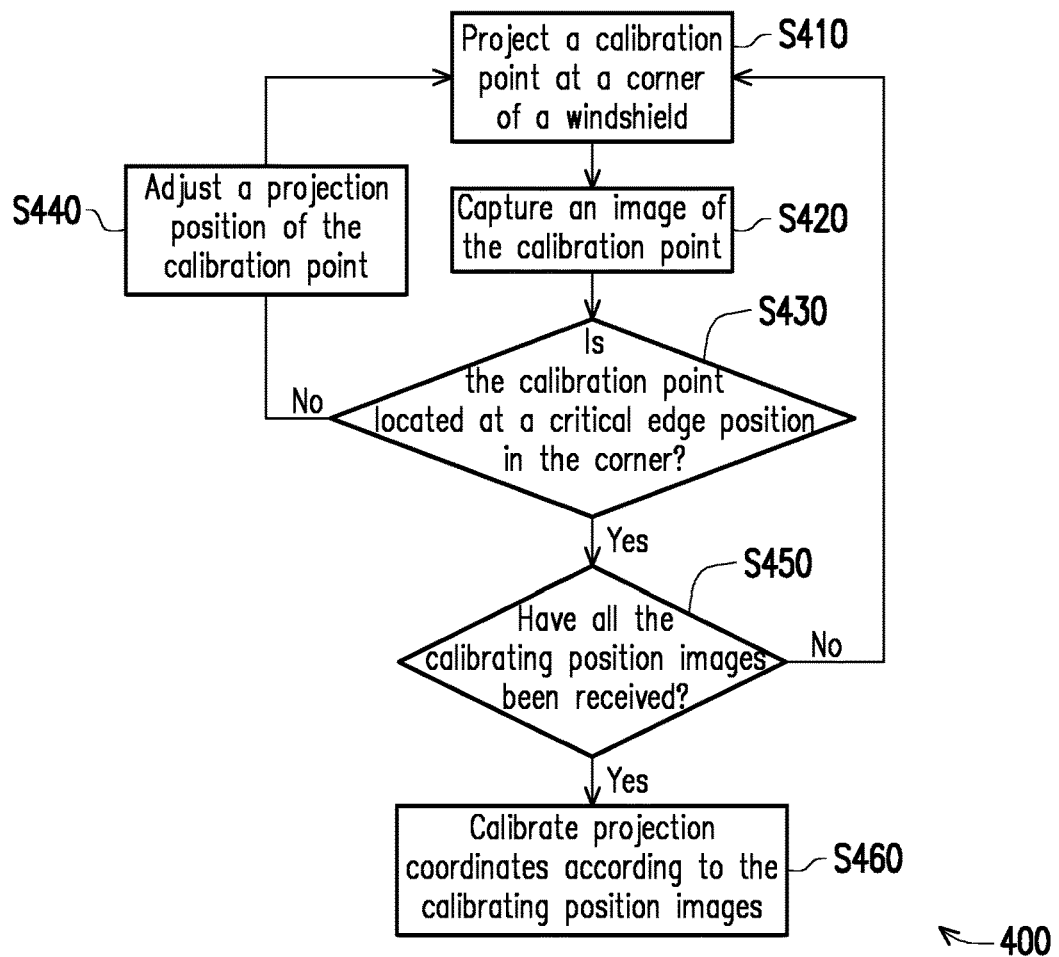
FIG. 7 is a flowchart of a projection calibration method of a head up display system according to an embodiment of the disclosure.
Figure 8:
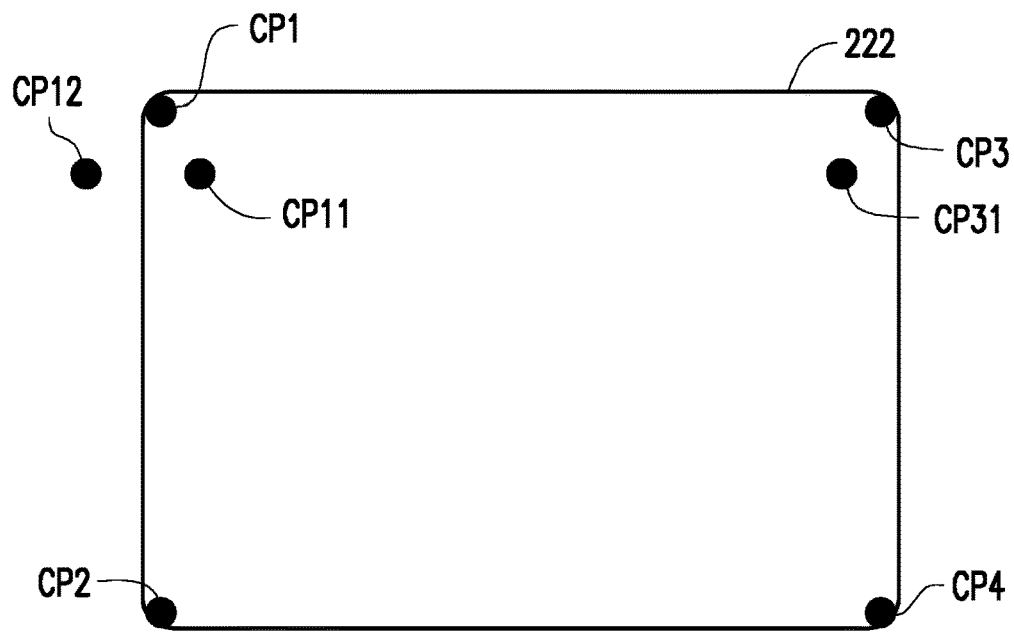
FIG. 8 is a schematic diagram of placements of calibration points on a windshield according to an embodiment of the disclosure.

FIG. 6 is a block diagram of a head up display system according to another embodiment of the disclosure. FIG. 7 is a flowchart of a projection calibration method of a head up display system according to an embodiment of the disclosure. FIG. 8 is a schematic diagram of placements of calibration points on a windshield according to an embodiment of the disclosure. Referring to FIG. 6 and FIG. 7, a head up display system 10' and a projection calibration method 400 of the present embodiment are applicable to the head up display system 10, the control method 100 and the control method 300 in the above embodiments. The difference lies in that the head up display system 10' further includes an image capturing device 160 and an environment image capturing device 170, compared with the head up display system 10. Detailed steps of image calibration of the head up display system 10' are described below with components in the head up display system 10' and the embodiment in FIG. 3.

In the present embodiment, the head up display system 10' further includes the image capturing device 160, such as a color video camera or the like, disposed in a position facing the windshield 222 and coupled to the processor 130 to capture an image of the windshield 222. Since vibration generated when the vehicle travels affects projection accuracy of the head up display device 120, a projection calibration operation may be performed automatically or manually after a specific time period or after an accumulated mileage exceeds a threshold value.

In step S410, when the vehicle 220 (vehicle) is stationary, the projector 150 projects a calibration point at each corner of the windshield 222. For example, a calibration point CP11 is projected at the upper left corner of the windshield 222 shown in FIG. 8. Next, in step S420, the processor 130 controls the image capturing device 160 to capture an image of the calibration point on the windshield 222. For example, an image of the calibration point CP11 projected in the upper left corner of the windshield 222 is captured. In step S430, the processor 130 further determines whether each calibration point is located at a critical edge position in the corresponding corner according to the images of the calibration points. For example, the processor 130 determines whether the calibration point CP11 is located at the critical edge position in the upper left corner according to the image of the calibration point CP11. The critical edge position herein is referred to as a boundary limit point of the windshield 222. For example, the processor 130 may determine whether the image of the calibration point CP11 is an image that could be seen through the windshield 222 or an image reflected by the opaque vehicle case 224, thereby determining whether the calibration point CP11 is in the critical edge position in the upper left corner of the windshield 222. In the present embodiment, a projection ray of the calibration point CP11 goes through the windshield 222, which means that the calibration point CP11 is within the windshield 222. Therefore, it is determined that the calibration point CP11 is not in the critical edge position in the upper left corner of the windshield 222, and step S440 is then performed.

In steps S440 and S410, when the processor 130 determines that one of the calibration points is not in the critical edge position in the corresponding corner, the processor 130 adjusts a projection position of that calibration point and controls the projector 150 to project a new calibration point CP12 at a different position in the upper left corner, and steps S420 and S430 are performed again. When the processor 130 determines that the image of the calibration point CP12 is an image reflected by the opaque vehicle case 224, it means that a projection position of the calibration point CP12 exceeds the range of the windshield 222, and thus the process returns to step S440. The above steps are repeated several times until the processor 130 determines that the calibration point CP1 is in the critical edge position in the upper left corner of the windshield 222. Then, the processor 130 sets the image of the calibration point CP1 as a calibrating position image of the upper left corner, and then performs step S450. In step S450, the processor 130 determines whether all the images of the calibration points in the corners of the windshield 222 have been received. For example, the processor 130 determines that only the image of the calibration point in the upper left corner of the windshield 222 has been received. Thus, step S410 is performed again, in which a calibration point CP31 may be projected at the upper right corner instead. Steps S410 to S450 are repeated until the processor 130 finds the critical edge positions (e.g., calibration points CP1, CP2, CP3 and CP4) in all the corners of the windshield 222.

In step S460, the processor 130 determines a boundary of the windshield 222 according to the calibrating position images, so as to calibrate projection coordinates.

Therefore, in the present embodiment, the head up display system 10' not only provides a function of adaptively changing the display position as the driver's gaze changes but also has a technical effect of projection calibration.

In the present embodiment, the head up display system 10' further includes the environment image capturing device 170. The environment image capturing device 170 is, for example, an imaging device such as a color video camera, and is coupled to the processor 130. The environment image capturing device 170 may be disposed in the rear-view mirror M1 or elsewhere in the vehicle 220, and is configured to capture an environment image surrounding the vehicle 220, particularly a rear image (including a direct rear environment image, a left rear environment image or a right rear environment image). The installation position of the environment image capturing device 170 and the content of images captured by the environment image capturing device 170 are not limited in the disclosure.

The content of the display image 230 provided by the head up display system 10' may correspond to the sight movement of the driver 210. For example, when a signal light of the vehicle 220 is on and the processor 130 determines that a deviation direction of the gaze position relative to the initial gaze position is the same as a direction indicated by the signal light, the processor 130 makes the display image 230 include a right rear environment image or a left rear environment image received from the environment image capturing device 170. For example, when a right signal light is on and the gaze of the driver 210 deviates to the right, the display image 230 additionally displays the right rear environment image. Similarly, when a left signal light is on and the gaze of the driver 210 deviates to the left, the display image 230 additionally displays the left rear environment image. In this way, the driver 210 does not need to turn their head dramatically to view the image in the rear-view mirror M1. In an embodiment, when the driver 210 drives in a reverse gear of the vehicle 220, the processor 130 makes the display image 230 include not only the original driving information, but also the direct rear environment image, the right rear environment image, and the left rear environment image. In an embodiment, the driver 210 may gaze at a specific positioning point for more than a predetermined time to trigger other functions, such as providing a backup rear view image by the environment image capturing device 170 and so on. The disclosure does not limit the triggering operation and content triggered by the gaze. Therefore, the head up display system 10' may further have the function of providing a display image corresponding to the driver's gaze direction.

It is also to be noted that in an embodiment, the head up display system 10' may not include the image capturing device 160 or the environment image capturing device 170. The disclosure does not limit that the image capturing device 160 and the environment image capturing device 170 must both be present.

In summary, the head up display system and the control method thereof according to the embodiment of the disclosure are applicable to a vehicle. By pre-locating the initial gaze position before the vehicle starts moving, tracking the driver's gaze position in real time, and then comparing the driver's current gaze position with the initial gaze position to control the projector to project the display image onto the originally preset first projection position or the second projection position corresponding to the current gaze position, it is possible to make the display image move with the driver's gaze, and even to trigger the content displayed on the display image through movement of the driver's gaze. In addition, in the head up display system and the control method thereof according to the embodiment of the disclosure, when the vehicle is stationary, projection coordinates can be calibrated by re-defining the range of the windshield by projecting the positioning points by the projector.

Although the disclosure has been described with reference to the above examples, it is clear for one of ordinary skill in the art that modifications to the described examples may be made without departing from the spirit of the disclosure. Accordingly, the scope of the disclosure will be defined by the attached claims and not by the above detailed descriptions.

What is claimed is:

1. A head up display system for a vehicle, comprising:
   an eye tracking device, configured to pre-locate an initial gaze position of a driver of the vehicle before the vehicle starts moving, and to detect a gaze position of the driver in real time; and
   a head up display device, comprising:
      a projector, configured to project a display image; and
      a processor, coupled to the eye tracking device and the projector, wherein the processor compares the gaze position with the initial gaze position, and controls the projector to project the display image onto a first projection position or a second projection position according to a comparison result, wherein the first projection position corresponds to the initial gaze position and the second projection position corresponds to the gaze position,
   wherein the first projection position and the second projection position are below the initial gaze position and below the gaze position, respectively.

2. The head up display system according to claim 1, wherein, when the comparison result indicates that the gaze position matches the initial gaze position, the display image is projected onto the first projection position, and when the comparison result indicates that the gaze position does not match the initial gaze position, the display image is projected onto the second projection position.

3. The head up display system according to claim 1, wherein the processor controls the projector to project positioning points at respective positions on a windshield, and obtains, through the eye tracking device, eye images of the driver gazing at the positioning points sequentially, wherein the processor determines the initial gaze position according to the eye images of the driver gazing at the positioning points.

4. The head up display system according to claim 1, further comprising:
   an image capturing device disposed in a position facing a windshield and coupled to the processor,
   wherein, when the vehicle is stationary, the projector projects a calibration point at each corner of the windshield, and the image capturing device captures an image of each calibration point.

5. The head up display system according to claim 4, wherein the processor further determines whether each calibration point is located at a critical edge position in the corresponding corner according to the images of the calibration points, and when the processor determines that each calibration point is located at the critical edge position in the corresponding corner, the processor sets the image of each calibration point as a calibrating position image of the corresponding corner.

6. The head up display system according to claim 5, wherein the processor further determines a boundary of the windshield according to the calibrating position images of the corners, so as to calibrate projection coordinates.

7. The head up display system according to claim 5, wherein, when the processor determines that any of the calibration points is not located at the critical edge position in the corresponding corner, the processor re-projects the calibration points.

8. The head up display system according to claim 1, wherein, when the eye tracking device fails to detect the gaze position in real time, the processor controls the projector to project the display image to the first projection position.

9. The head up display system according to claim 8, wherein, the eye tracking device re-locates the initial gaze position after the vehicle stops.

10. The head up display system according to claim 8, wherein the display image is projected onto the first projection position until the eye tracking device detects the gaze position again, and the processor re-compares the gaze position with the initial gaze position.

11. The head up display system according to claim 1, further comprising:
   an environment image capturing device coupled to the processor and configured to capture a rear environment image, a right rear environment image or a left rear environment image of the vehicle,
   wherein, when a signal light of the vehicle is on and the processor determines that a deviation direction of the gaze position relative to the initial gaze position is the same as a direction indicated by the signal light, the processor further makes the display image include the right rear environment image or the left rear environment image received from the environment image capturing device; and
   when the driver selects a reverse gear of the vehicle, the processor further makes the display image include the rear environment image, the right rear environment image and the left rear environment image.

12. The head up display system according to claim 1, wherein the eye tracking device comprises:
   an electromagnetic wave emitter coupled to the processor and disposed on a side of the vehicle facing the driver for emitting an electromagnetic wave to irradiate on an eye area of the driver; and
   an electromagnetic image capturing device coupled to the processor and disposed on the same side as the electromagnetic wave emitter for capturing an eye image of the driver after the electromagnetic wave is reflected by the eye area,
   wherein the processor controls the electromagnetic wave emitter and receives the eye image of the driver, and calculates the gaze position of the driver according to the eye image of the driver.

13. The head up display system according to claim 12, wherein the electromagnetic wave emitter is an infrared emitter, and the electromagnetic image capturing device is an infrared video camera.

14. A control method of a head up display system for a vehicle, comprising:
   pre-locating an initial gaze position of a driver by an eye tracking device, and generating a first projection position according to the initial gaze position before the vehicle starts moving;
   detecting a gaze position of the driver in real time by the eye tracking device, and generating a second projection position in real time according to the gaze position; and
   comparing the gaze position with the initial gaze position and controlling a projector to project a display image onto the first projection position or the second projection position according to a comparison result, wherein the first projection position and the second projection position are below the initial gaze position and below the gaze position, respectively.

15. The control method according to claim 14, wherein the step of controlling the projector to project the display image onto the first projection position or the second projection position according to the comparison result comprises:

when the comparison result indicates that the gaze position matches the initial gaze position, projecting the display image onto the first projection position, and when the comparison result indicates that the gaze position does not match the initial gaze position, projecting the display image onto the second projection position.

16. The control method according to claim 14, further comprising:

when the vehicle is stationary, projecting a calibration point at each corner of a windshield by the projector, and capturing an image of each calibration point by an image capturing device.

17. The control method according to claim 16, wherein the step of capturing the image of the calibration point by the image capturing device further comprises:

determining whether each calibration point is located at a critical edge position in the corresponding corner according to the images of the calibration points, and when determining that each calibration point is located at the critical edge position in the corresponding corner, setting the image of each calibration point as a calibrating position image of the corresponding corner.

18. The control method according to claim 17, further comprising determining a boundary of the windshield according to the calibrating position images of the corners, so as to calibrate projection coordinates.

19. The control method according to claim 17, wherein the step of determining whether each calibration point is located at the critical edge position in the corresponding corner according to the images of the calibration points further comprises:

when determining that any of the calibration points is not located at the critical edge position in the corresponding corner, re-projecting the calibration point.

* * * * *